United States Patent [19]

D'Antonio

[11] 4,452,087

[45] Jun. 5, 1984

[54] PIPELINE MONITORING SYSTEM

[76] Inventor: Nicholas F. D'Antonio, 7695 Admiral Dr., Liverpool, N.Y. 13088

[21] Appl. No.: 365,600

[22] Filed: Apr. 5, 1982

[51] Int. Cl.³ .............................................. G01M 5/00
[52] U.S. Cl. ...................................................... 73/786
[58] Field of Search .................... 73/786, 730; 364/550, 364/556; 33/147 D, 148 D

[56] References Cited

U.S. PATENT DOCUMENTS

| | | | |
|---|---|---|---|
| 2,416,664 | 2/1947 | Ruge .................................. | 33/147 D |
| 2,420,148 | 5/1947 | Ostergren ............................ | 73/730 |
| 3,149,492 | 9/1964 | Weinberg .............................. | 73/730 |
| 4,055,078 | 10/1977 | D'Antonio et al. .................. | 73/767 |
| 4,240,288 | 12/1980 | D'Antonio et al. ............... | 73/862.65 |

Primary Examiner—Anthony V. Ciarlante
Attorney, Agent, or Firm—D. Peter Hochberg

[57] ABSTRACT

A system for monitoring the stresses in a pipeline for conducting fluid materials, comprising sets of stress-sensing elements electrically connected together at spaced locations along the pipeline, groups of the sets being electrically connected together to form zones, the respective zones being electrically connected to accumulation centers where data from the sets of sensors is accumulated and reduced, and a central control center electrically connected to the accumulation centers for receiving, interpreting and displaying information from the sensing elements.

36 Claims, 15 Drawing Figures

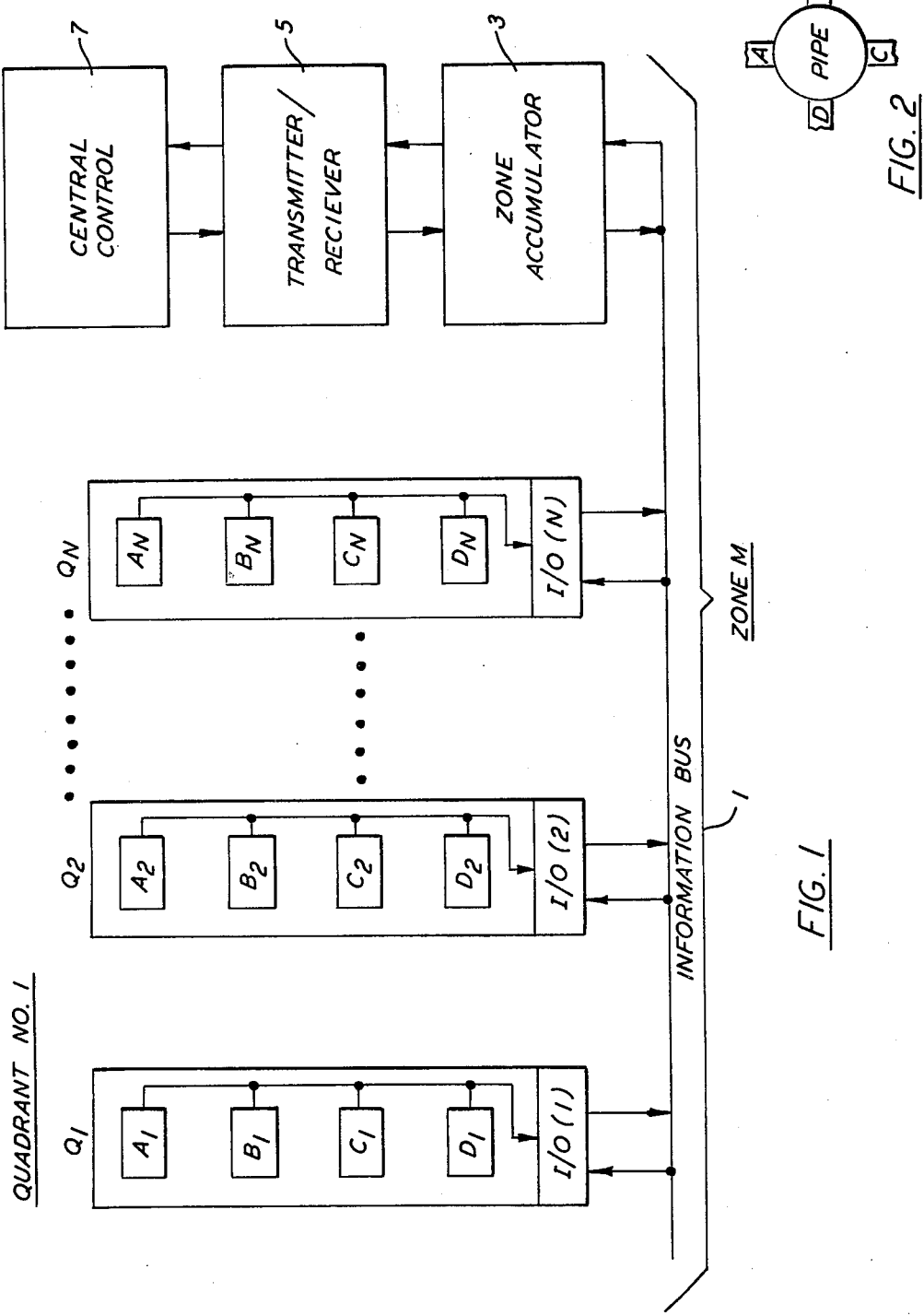

PIPELINE MONITORING SYSTEM

BACKGROUND OF THE INVENTION

This invention relates to the monitoring of pipelines or other conduits to determine the nature of desired characteristics of the pipeline, such as the magnitude and/or gradient of stresses on the pipeline and the time rate at which they develop. The invention further relates to the detection of potential or actual failure places in a pipeline.

Pipelines are widely used for transporting all types of fluid materials such as oil, liquid chemicals, slurries, particulate matter, natural and other gases, etc. There have recently been installed extremely long pipelines for transporting oil across vast distances, such as the Alaskan pipeline, and pipelines for transporting natural gas across similar distances are soon to be constructed. In some situations, especially with regard to the transport of such natural resources as oil and natural gas to distant locations such as distribution points, the pipeline must pass through barren regions having harsh natural environments where temperatures are likely to be extremely low and to vary greatly. For example, pipelines passing through the frigid regions of Alaska, Northern Canada and Siberia are expected to encounter alternate freezing and thawing conditions which cause movement of the earth on or in which the pipeline is situated. Not only can varying weather conditions cause such freezing and thawing, but the preheating of material in the pipe to improve its flow can cause localized thawing in an otherwise frozen environment. Similarly, gas at a temperature below the freezing point of water can cause the freezing of an otherwise unfrozen environment. Even if the pipeline is mounted on supports above the ground or on a gravel bed beneath the ground, unstable soil conditions resulting from such freezing and thawing can cause the pipe to heave and impose substantial pressures on the pipe. If these pressures, in combination with those due to the fluid in the pipe, exceed the critical limits of the pipe, rupture may occur. In view of the high flow rate of the material through such pipelines, and in further view of the liklihood that a rupture would occur in a remote region, the economic losses and environmental damage from such a rupture could be severe. The need for some means of avoiding pipeline ruptures is thus very great.

There has heretofore been no means devised for satisfactorily monitoring gas or other pipelines to warning of impending rupture or other failure. There have been suggestions to employ radar detection, satellite detection and inertial guidance techniques for performing the monitoring function. However, these techniques all involve indirect monitoring because there is no physical interface with the pipe structure, and are therefore inherently deficient. Moreover, none are known to have been successfully employed. What is preferred, and what the present invention provides, is a direct monitoring system, where stress measurements are taken directly through a physical contact with the pipe.

SUMMARY OF THE INVENTION

The invention described below is an electronic system which can be used to directly monitor stress characteristics of pipelines, even of pipelines having long sections unattended and located in uninhabited regions. In its preferred form, the invention needs but a low power source. It comprises sets of stress sensors connected at various locations spaced along the pipeline, groups of the sensors being connected together to form zones, and the various zones being electrically connected to a central control center. The sets are periodically interrogated for stress information, and the information is repeatedly compiled, reduced and interpreted to yield intelligible output signals.

BRIEF DESCRIPTION OF THE DRAWINGS

FIG. 1 is a block diagram of the functional elements of a monitoring system according to the preferred embodiment of the invention;

FIG. 2 is a cross section of a part of a pipeline showing how a set of sensors of FIG. 1 can be mounted thereon;

DETAILED DESCRIPTION OF THE PREFERRED EMBODIMENT

Figure 3:
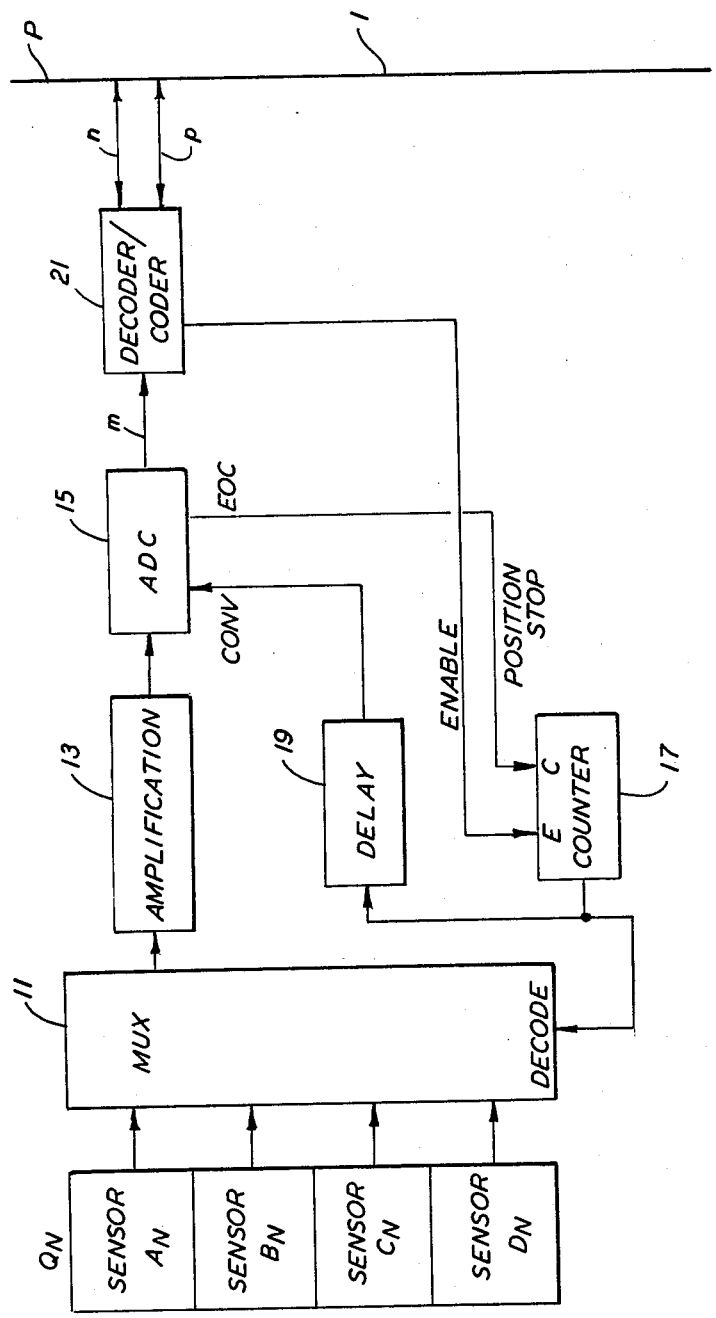
FIG. 3 is a block diagram showing the functional elements for processing analog stress signals from one set of sensors in the system of FIG. 1.

Turning first to the block diagram of the preferred embodiment of the invention shown in FIG. 1, a group of sets of interconnected stress sensors are shown, each set being located at a detector location and connected to an information bus 1. The group of N sets connected to bus 1 form a zone (Zone M) for a given section of a pipeline, it being contemplated that information from the sets of each zone will be consolidated for interrogation such as by an aircraft. Similarly, the information from various zones would be consolidated for interrogation. Although the respective sets could be connected to a central control without the zone arrangement, the employment of zones which act as sub-accumulation centers that consolidate data and periodically transmit it to a central computing center reduces substantial transmission power. Each set is shown as including four sensors (A, B, C and D, whose subscripts indicate the set within which the respective sensors are located), and the respective sets are referred to as quadrants Q (with the same subscript arrangement noted above). The sensors A-D of each set or quadrant Q are mounted equiangularly about respective sections of the pipe being monitored as indicated by the sensors A, B, C and D in FIG. 2. The sensors can be physically secured to the pipeline at each detector location by means of welding, straps, springs, etc., some of which are described hereinafter. It should be understood that each set is not necessarily composed of four sensors, although four sensors are the number per set in the preferred embodiment when the system is employed for monitoring natural gas pipelines. When the sensors are arranged as shown in FIG. 2, the computations for the respective stresses and stress gradients are as follows:

local stress:
$A_1-C_1$
$B_1-D_1$
stress gradient:
$(A_1-C_1)-(A_2-C_2)$
$(B_1-D_1)-(B_2-D_2)$
$(A_2-C_2)-(A_3-C_3)$
etc.

Zone M is thus composed of quadrant detectors $Q_1-Q_N$ connected to information bus 1. A zone accumulator 3 is electrically connected to bus 1. The zone accumulator includes a memory unit such as a random access memory (RAM), and a data processor for making initial data reductions according to predetermined criteria applied to the raw data received from the respective detector locations. A zone transmitter/receiver 5 is connected to zone accumulator 3 for receiving the output of zone accumulator 3 and for transmitting information signals to the central control which is connected to a number of zones; zone transmitter/receiver 5 further includes coding and decoding means for accomplishing the transmitting and receiving functions.

The central control 7 is connected to the transmitter/receiver of each zone. Central control 7 retrieves information from each zone, makes a final reduction of that data and includes a display for displaying the information in an intelligible and useable form.

As mentioned earlier, the zone arrangement described above lends itself to interrogation by passing aircraft. If RF (radio frequency) transmission to passing aircraft is employed, the data from the respective zones could be stored on magnetic tape or disks, or it could be transmitted directly to a transportable semiconductor memory system. The central control could be provided with a computer peripheral assembly having a housing for receiving the memory module, and the module carrying the stored information thus received in the aircraft could be plugged into that housing for the fast and efficient processing of the stored data for display.

It might in some situations be advantageous to make initial computations at the detector location (the quadrant interface), but in view of the resulting loss of redundancy data the advantages are questionable.

Referring next to the quadrant location shown in the block diagram of FIG. 3, it should be observed that FIG. 3 is representative of the quadrant locations throughout each zone, with the exception of the decoders where the address code is unique for each location. This uniformity has significant practical and economic advantage, for it makes feasible the use of custom or semi-custom integrated circuits (ICs) for the many detector locations along the pipeline. The unique code for each location could conveniently be set by a burn link or a digital link format (on site, if desired), which would also allow for easy replacement in case of failure. With this arrangement, when and only when, a specific digital code appears on the bus would a particular quadrant be enabled to transmit its data on to the bus for transfer to the zone accumulator. This coding arrangement assures a precise time interval for interrogation of the respective quadrants so that orderly transfer will occur from each successive location for further processing, since the transmission of the respective coding signals is transferred in a precise and orderly fashion as explained below.

The circuitry for the quadrant detector of FIG. 3 includes sensors $A_N$, $B_N$, $C_N$ and $D_N$ forming quadrant $Q_N$, connected to a multiplexor (MUX) 11. MUX 11 is a four position analog multiplexor which sequentially interrogates sensors $A_N$-$D_N$. MUX 11 is connected to an amplifier (AMP) 13 which is connected to an analog-to-digital converter (ADC) 15. ADC 15 is interconnected to MUX 11 through a counter 17 and a delay 19, and to a decoder/coder 21 which is connected to bus 1 and to counter 17 as explained in detail below.

Any coded signal carrying the code of the detector $Q_N$ is received and decoded by decoder 21, which generates an enabling signal to counter 17. This enabling signal at the E input of counter 17 permits an up-count when the appropriate signal appears at the clock input terminal C. Each change of state on counter 17 issues a convert command to ADC 15, but only after being delayed long enough in delay 19 so that MUX 11 has time to settle and pass a stable sensor signal on to amplifier 13. That is, the signal from counter 17 is coded, and functions to address and actuate MUX 11. MUX 11 decodes the signal from counter 17. Once addressed, MUX 11 interrogates the sensors of $Q_N$, AMP 13 is selected to amplify the output of MUX to a level useable by ADC 15. The output of ADC 15 is coded by coder/decoder 21 and transferred to bus 1 where it is transmitted to the zone accumulator for storage in the local RAM. At a predetermined time after each sensor is converted to its digital equivalent, ADC 15 generates an end of convert (EOC) signal to the clock input of counter 17 so that the next sensor is converted. After all sensors are read, the enable signal is reset and terminates the interrogation of quadrant detector $Q_N$.

Figure 4:
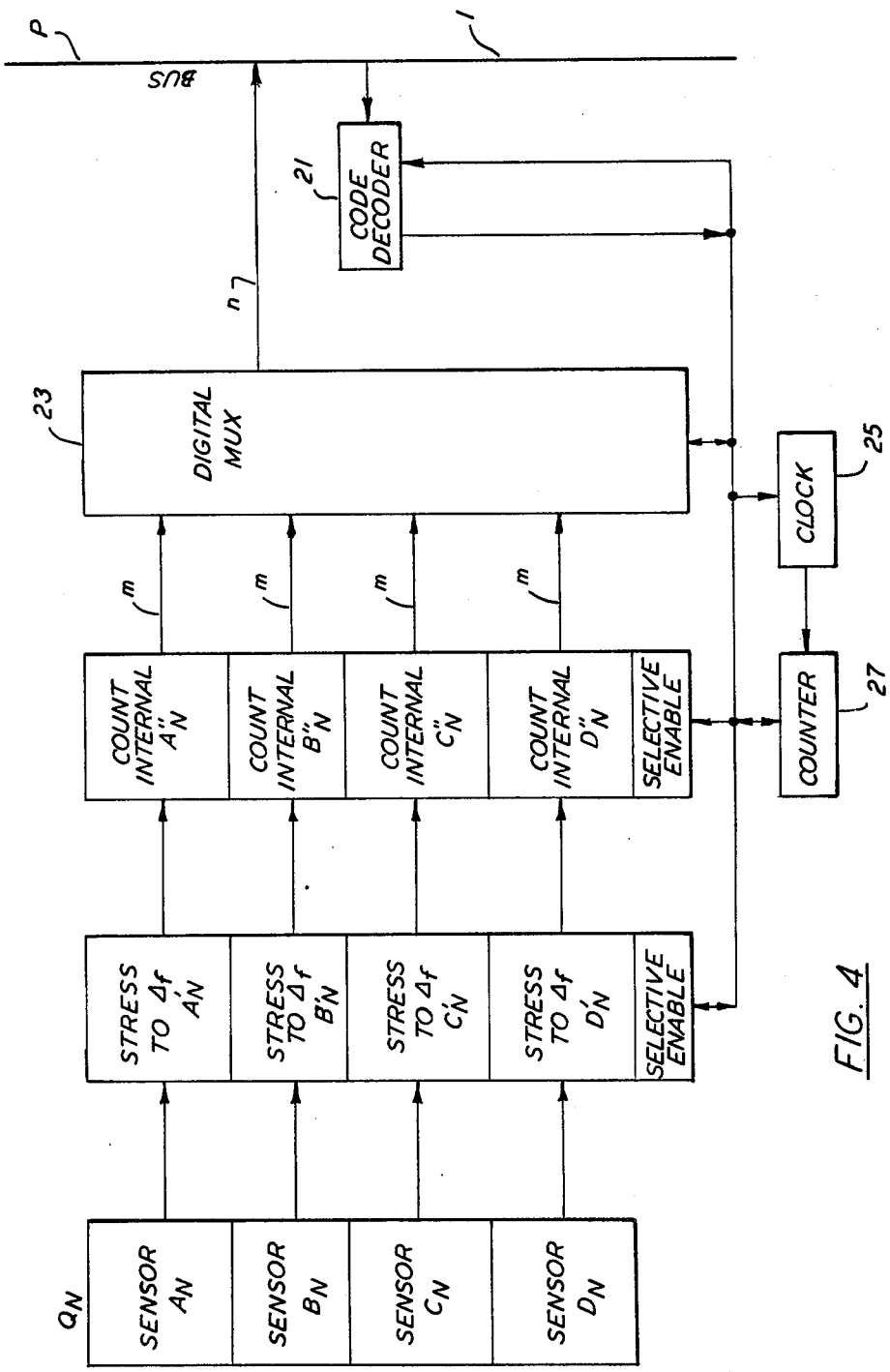
FIG. 4 is a block diagram showing the functional elements for processing stress signals wherein sensed stresses are expressed in terms of frequency, for one set of sensors in the system of FIG. 1.

An alternate arrangement for processing signals at a detector location to the analog arrangement shown in FIG. 3 is the frequency responsive arrangement of FIG. 4. In FIG. 4, the stress responsive sensors $A_N$-$D_N$ of $Q_N$ generate signals respectively to stress oscillators $A_N'$-$D_N'$, whose respective frequencies are varied by an amount $\Delta f$ according to the applied stress. Stress oscillators $A_N'$-$D_N'$ are in turn connected to interval counters $A_N''$-$D_N''$ which count the frequency of oscillation of the respective oscillators during the time interval the latter are active. A digital MUX 23 interrogates the respective counters by transferring the values to the data bus.

Thus, upon transmission of a signal of the unique code of $Q_N$, coder/decoder 21 decodes that signal and generates a signal enabling a clock 25, a counter 27, stress oscillators $A_N'-D_N'$ and interval counters $A_N''-D_N''$ via selective enable switches. Clock 25 controls the interval that the respective counters $A_N''-D_N''$ count the number of oscillations of the respective oscillators $A_N''-D_N''$, according to a precise, preselected period of time. MUX 23 transmits the respective "count values" to BUS 1 for transfer to the zone accumulator memory. Counter 27 transmits a termination of count signal to coder/decoder 21 to end the interrogation of the detector $D_N$.

Figure 5:
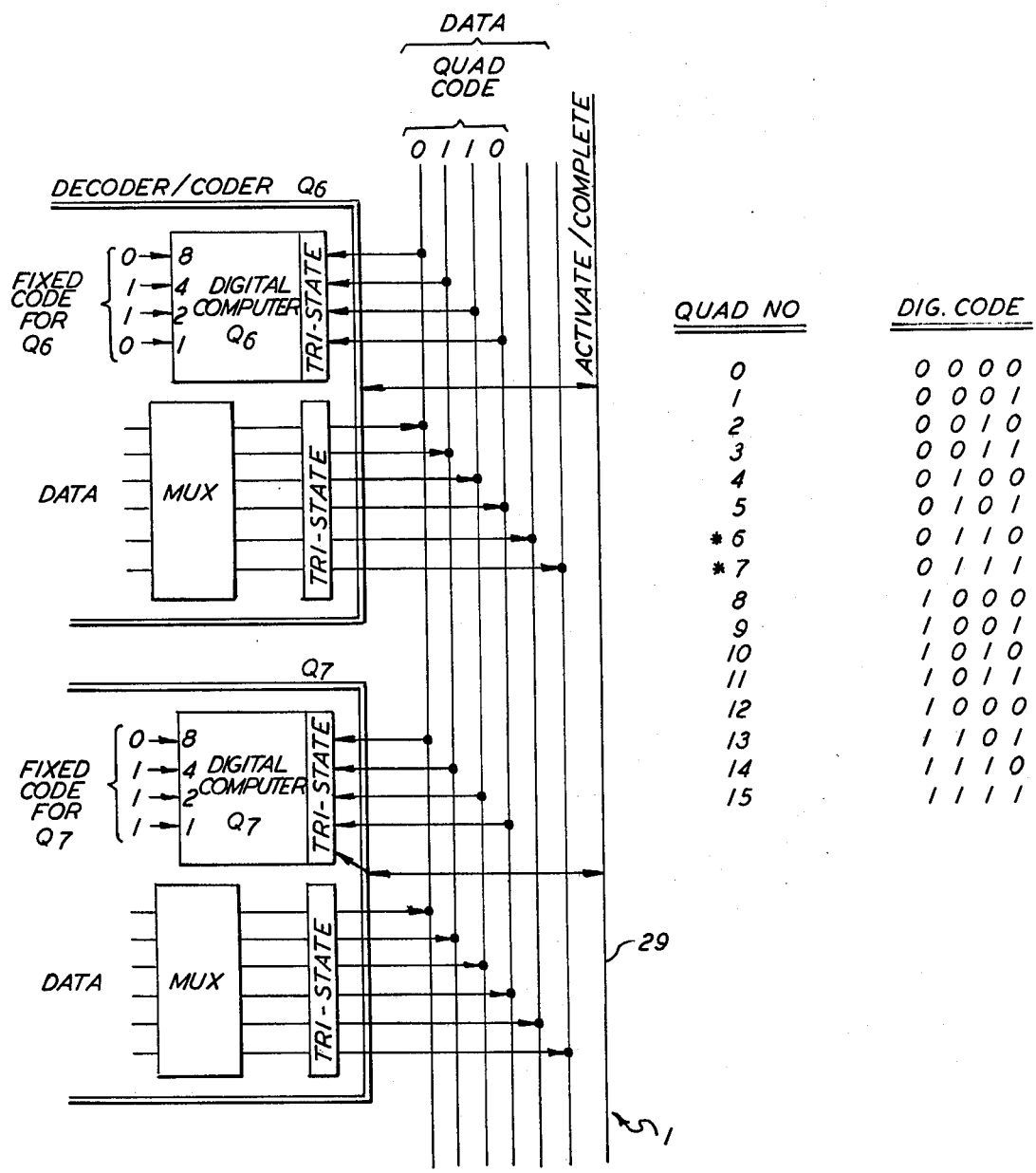
FIG. 5 is a block diagram illustrating the means for interrogating a number of interconnected sets of sensors in the system of FIG. 1.

FIGS. 1, 3 and 4 have referred to the transmission of coded signals for commencing the interrogation of the respective detectors, and FIG. 5 is a block diagram for a four-bit interrogate command network capable of retrieving data from 16 quadrant locations (of course, networks of any number of bits could be used according to the number of quadrant locations, the latter being virtually unlimited). The transmission lines include an activate line 29 for activating the detectors or quadrants of an entire zone (i.e., for opening comparator tri-state lines in the embodiment shown). The bus carries a four-bit code for addressing a particular detector having that unique code, so bus 1 must have at least four lines in addition to activate line 29 in the configuration shown, but it should be noted that one of the 16 codes, say 0000, could be momentarily pulsed on to activate the comparators so that the desired quadrant selection can be made. Of course one quadrant is lost but one line is gained. When activate line 29 is open, and the code of a particular set (quadrant) of sensors matches the fixed code carried on bus 1, the data output ports at that detector location are activated while at the same time the comparator lines of the decoder at that location go to the open (or tri-state) condition thereby freeing the bus to carry data. Any number of bits can be used to transmit data from the detector locations; in FIG. 5 six bits are used so bus 1 must have at least six lines in addition to the activate line in the embodiment shown.

Figure 6:
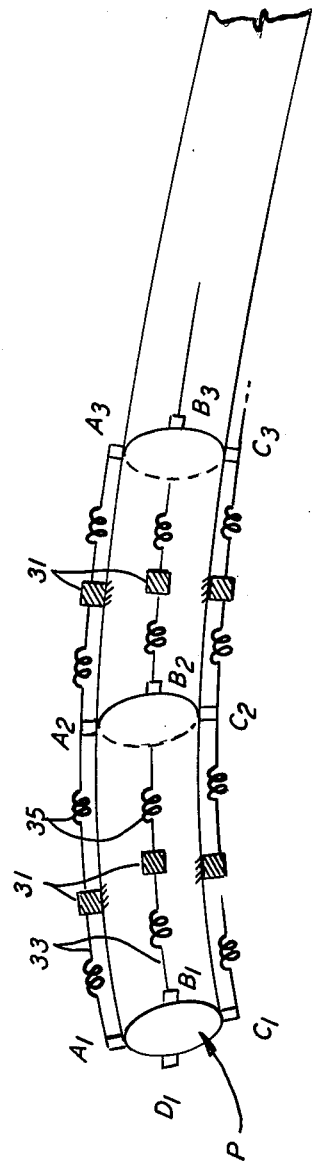
FIG. 6 is a pictorial view of a pipeline deploying the system of FIG. 1 showing one manner of mounting sensors on the pipeline, the pipeline being stressed into a concave configuration.

The system is programmed to retrieve data in sequence from each set of sensors in the zone, with the bus transmitting that data to the zone accumulator which logs the event. Thus, referring still to FIG. 5, while line 29 is active (high) and bus 1 carries the four-bit quadrant code 0110(6) which matches the fixed code for detector set $Q_6$, the coded signal is read and decoded, the digital comparator at $Q_6$ is enabled and the MUX at $Q_6$ multiplexes $A_1$–$A_4$ of $Q_6$ and transmits the data (in six-bit form) from $Q_6$, via the open data parts through the tri-state to the six lines of bus 1. Upon the conclusion of the interrogation of $Q_6$, a pulse is again sent along line 29 to re-open all of the decoders in the zone. Simultaneously, the next digital word corresponding to one of the fixed codes of another quadrant is sent. When bus 1 transmits the 0111(7) code corresponding to the fixed code of $Q_7$, transmissions like those of location $Q_6$ occur. The chart on the right side of FIG. 6 illustrates the 16 possible quadrant codes for a four-bit interrogation command network. It should be noted that the most efficient use of the lines would have the number of quadrant locations equal to the digital resolution of the data. In the case of FIG. 5 6-bit resolution would lead to the use of 64 quadrants in the zone.

Turning to FIG. 6, the location of the sensors of a group of quadrants of a particular zone are shown. Quadrants $Q_1$–$Q_3$ are shown, with their respective sensors A-D disposed at 90° increments around a pipe P. Between each quadrant Q, a mounting member 31 is fixed on the pipe such as by welding. Corresponding adjacent sensors $A_1$, $A_2$, $B_1$, $B_2$, $A_2$, $A_3$, etc. are connected to members 31 by lines 33 incorporating resilient members shown as springs 35. Generally speaking, the connecting members would lie flat on the pipe so as not to be disturbed by the surroundings, especially if it is buried. When the pipe is in a static, unloaded state, the lines and springs are drawn taut so that spring pressure is applied to opposite sides of each sensor in the lengthwise direction of the pipe. The amount of prestress is selected so that the design limits of the sensors will not be exceeded regardless of the amount of bend and concommitant stress occurring in the pipe. Thus, when the pipe incurs a concave heave as shown in FIG. 6, the stress in sensor $A_3$ increases while that in sensor $C_3$ decreases, and the stress in sensors $B_3$ and $D_3$ increases by equal amounts. A corresponding stress change would occur for any distortion of pipe depending on the direction and amount of heave of the pipe. For the situation shown in FIG. 6, the stress characteristics can be expressed as follows, where S=stress for the sensors indicated in subscript:

Stress at $Q_3$:

$$S_{A3}-S_{C3} \leq 0$$

$$S_{B3}-S_{D3}=0$$

Stress gradient between $Q_2$ and $Q_3$:

$$(S_{A3}-S_{A2})-(S_{C3}-S_{C2}) \text{ for the top of the pipe}$$

$$(S_{B3}-S_{B2})-(S_{D3}-S_{D2}) \text{ for the sides of the pipe}$$

Corresponding stress relationships can be expressed throughout the pipeline being monitored as a basis for the data being obtained and processed. Of course, other useful algorithms could be developed and employed for application with the data obtainable pursuant to the invention.

It was noted previously that data reduction is possible in the system disclosed. Since the stress values of sensors on opposite sides of the pipe should indicate some semblance of symmetry, it might be appropriate to discard the data at particular locations where such values are grossly unequal in that a redundancy algorithm may be reflecting faulty sensors or connectors at those locations. However, since disruption of the foregoing stress symmetry could also be indicative of an actual or impending failure of the pipe, care must be exercised in discarding any such data. A prior study as to how the stress and stress combinations will look for a host of potential failure modes would be vital for the use of correlation techniques in the reduction of data and subsequent diagnosis for the condition of the pipe.

The sensors employed in the arrangement of FIG. 6 could be of the variable impedance type as disclosed in U.S. Pat. Nos. 4,055,078 and 4,240,288 or in the form of variable capacitors or other devices whose sensitivity and accuracy are commensurate with the pipeline monitoring function.

Figure 7:
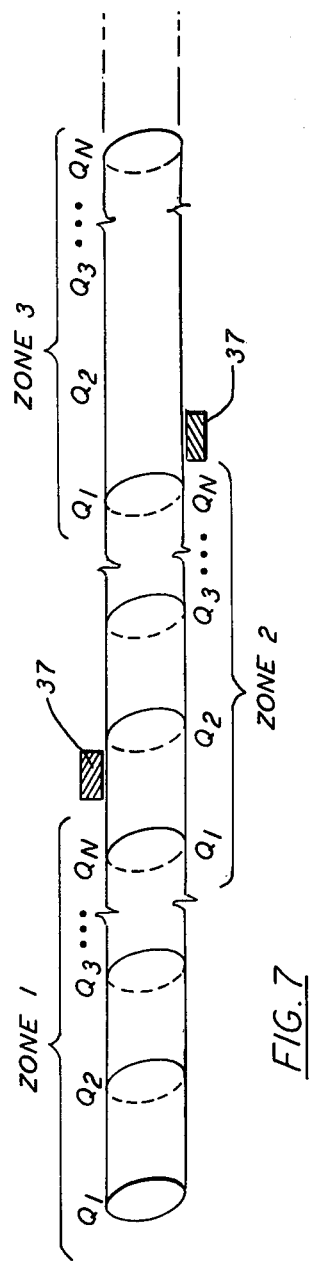
FIG. 7 shows a section of a pipeline on which the monitoring system of FIG. 1 is deployed, showing the locations of sets of sensors, and of several zones of such sets.

FIG. 7 shows how an arrangement of quadrant detectors of the type shown in FIG. 6 could be incorporated in a monitoring system comprising a number of zones (3 being shown), each zone having a zone accumulator 37 as discussed earlier.

Figure 8:
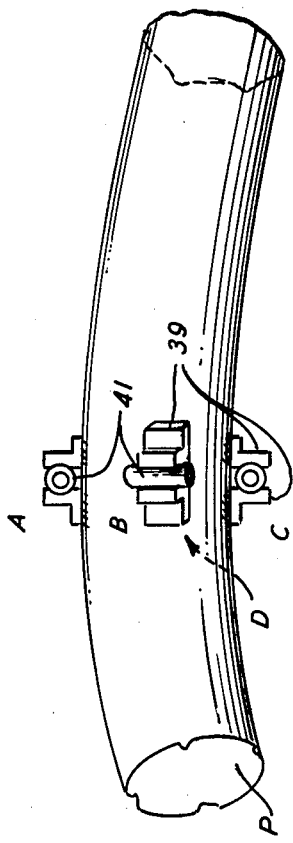
FIG. 8 shows in pictorial form a variation of the sensor mounting arrangement of FIG. 7, employing carbon cylinder sensing elements.
Figure 9B:
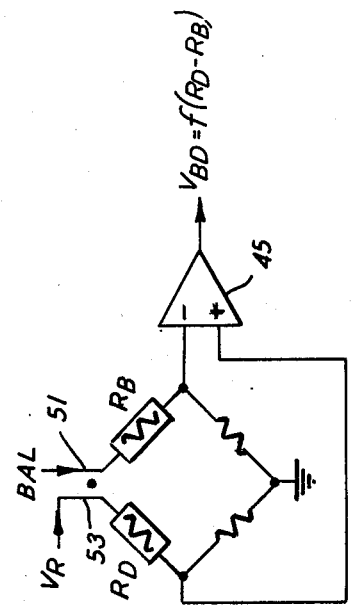
FIGS. 9A and 9B show schematically one manner in which a set of sensors of FIGS. 7 and 8 can be connected together according to the invention.
Figure 9A:
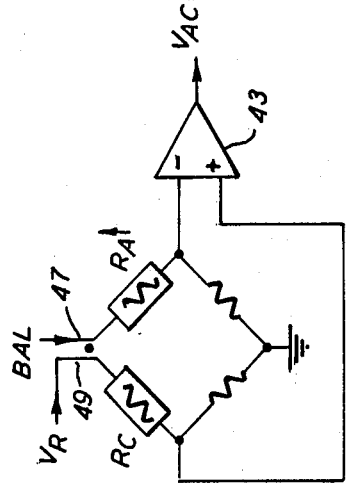

An alternative sensing system to that shown in FIG. 7 is shown in FIG. 8, where the line and springs are dispensed with; instead, each set of stress-sensing elements or quadrant detector location includes four pairs of stiff springs 39 welded to the pipe P cradling carbon cylinder sensing elements 41 whose electrical resistances decrease with increasing pressure. Elements 41 could be connected in various ways to perform their intended function. For instance, elements 41 can be connected in bridge circuits as shown in FIGS. 9A and 9B. If one pair of elements 41 on opposite sides of pipe P are located at positions A and C in FIG. 8 and have resistances $R_A$ and $R_C$, and the other pair are located at positions B and D in FIG. 8 and have resistance values $R_B$ and $R_D$; when a voltage $V_R$ is impressed on the bridge circuits and amplifiers 43 and 45 are connected across the bridge as shown, then the voltage output of amplifiers 43 and 45 expressed as follows and as shown on FIGS. 9A and 9B:

$$V_{AC}=f(R_C-R_A)$$

$$V_{BD}=f(R_D-R_B)$$

reflecting that $V_{AC}\alpha\Delta R_C-\Delta R_A$ while $V_{BD}\alpha\Delta R_D-\Delta R_B$. When pipe P is bent as shown, element 41 at position A is unloaded while element 41 at position C is compressed, the resistance values change as indicated by the arrows in FIG. 9A.

The arrangement described above offers the advantage of simplicity of the arrangement of FIG. 6, but it lacks the redundancy feature since the comparison of values at B and D, and A and C cannot be made to determine if those values are equal or at least obey the expected symmetry for the respective opposite locations of sensing elements on the pipe. However, the individual values of A, B, C and D can be obtained for comparison by connecting the respective sensors in separate bridge circuits with their own amplifiers.

The bridge circuits shown in FIGS. 9A and 9B have open legs 47 and 49 connected to resistors $R_C$ and $R_A$, and 51 and 53 connected to resistors $R_B$ and $R_D$, respectively (the bridge circuits of FIGS. 9A and 9B include resistors of fixed value in the remaining legs as shown). A balancing signal BAL is applied to legs 47 and 51, respectively, while an input signal $V_R$ is applied to legs 49 and 53, respectively, for the automatic balancing of the bridges while they are in the unstressed state prior to the pipeline being put into operation. This open leg arrangement may also be used to re-balance the system (i.e., calibrated to zero) during times when it is known that environmentally-induced stresses are minimal or non-existant. Such intermittent balancing could be co-ordinated with the brief removal of internal pressure from the pipeline to assure a totally relaxed state, after which the system could automatically be balanced.

Figure 10:
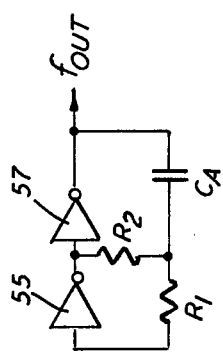
FIG. 10 is a schematic diagram of capacitative sensors connected to form a set in accordance with the invention.

Turning to FIG. 10, an alternate arrangement to the variable resistor sensors of FIGS. 8, 9A and 9B is shown. In FIG. 10, a pair of electronic inverters 55 and 57 are connected to form an R-C oscillator. A capacitor $C_A$ is connected to the output port of inverter 57 and to the input port of both inverters through resistors $R_1$ and $R_2$. The output of the circuit is a frequency $f_{out}$. Separate oscillator networks would be provided for each position A, B, C and D at each measuring station. Changes in the stress on the pipe would be reflected on corresponding changes in the capacitive value of the respective plates, which in turn would generate output signals reflective of that stress.

Figure 11:
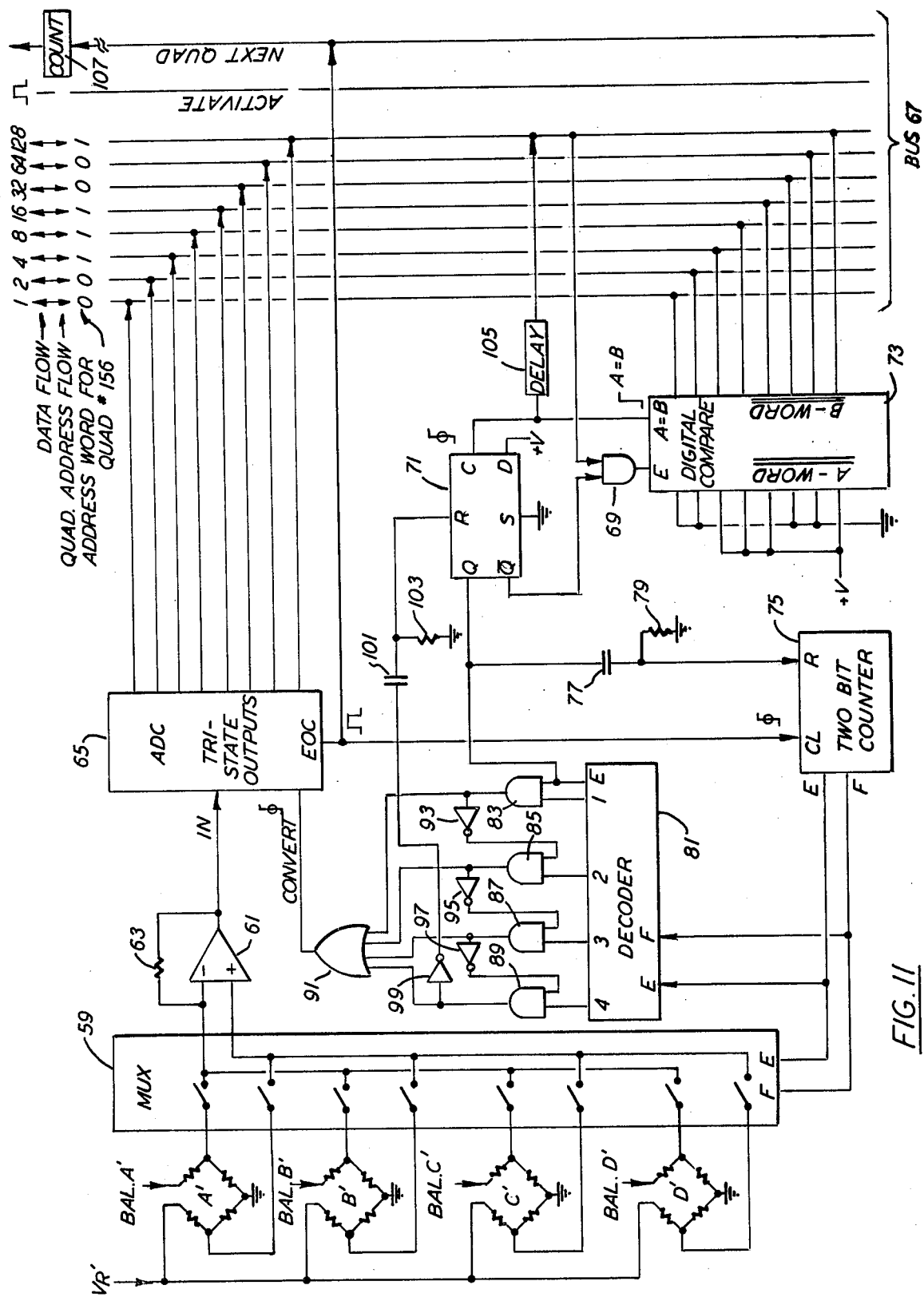
FIG. 11 is a schematic diagram of a set of resistive bridge sensors connected in a circuit in accordance with the embodiment of FIG. 1.

FIG. 11 shows in detail the circuitry for one quadrant location using resistance stress sensing monitors. The illustrated circuit is for the quadrant location at station 156 out of a possible 256 stations; that is, an 8-bit code is used for identification of the various quadrants along the pipe. If the stations or quadrant locations are placed at 40-foot intervals along the pipe, the zone length would be a little less than 2 miles; with nine bits, there would be 512 locations or about 4 miles to a zone and so on. Four independent bridges, labed A', B', C' and D', respectively, are used to detect the stresses at each of the four sensor locations of the quadrant. Each bridge is open at the top as discussed with respect to FIGS. 9A and 9B, and appropriate balancing signals are applied to the respective legs. A multiplexer 59 is connected to the respective bridges for sequentially connecting each bridge to an amplifier 61. It should be noted that multiplexer 59 is not essential to the circuit, but its incorporation reduces the number of amplifiers needed. A feedback resistor 63 is connected across amplifier 61. The output of amplifier 61 is connected to the input port of an analog to digital converter (ADC) 65, the ADC converting the analog stress value to its digital equivalent. ADC 65 has 8 tri-state outputs, and these are connected to the respective 8 lines comprising a bus 67. The circuit of FIG. 11 further includes an AND gate 69 having input ports connected to an activate line of bus 67 and to the $\bar{Q}$ port of a flip-flop 71. The output of AND gate 69 is connected to an E port of a digital comparator 73. As explained below, digital comparator 73 has 8 input ports designated "B word" which are connected to the same 8 lines of bus 67 as ADC 65. Digital converter 73 has another set of 8 input ports designated "A word", some of which are connected to a voltage source +V and the remaining ones of which are connected to ground. A two-bit digital counter 75 has an input port R connected to a port Q of flip-flop 71, through a connection including an R-C differentiator circuit composed of a capacitor 77 and a grounded resistor 79. Counter 75 has a clock input port "CL" connected by a line to an end of count ("EOC") of ADC 65, the latter connection being in turn connected to a "next quadrant" line of bus 67. Counter 75 has output ports E and F connected to respective input ports E, F of multiplexer 59, as well as to input ports E and F of a decoder 81. Decoder 81 has four outputs 1, 2, 3 and 4 which are connected to one of a pair of input ports of a set of AND gates 83, 85, 87 and 89, respectively. The output ports of the foregoing AND gates are connected to an OR gate 91. The output ports of three of these AND gates are connected in turn, to inverters 93, 95 and 97 which are in turn connected to the other input port of gates 85, 87 and 89. The output port of AND gate 89 is connected to an inverter 99 which is connected to an "R" port of flip-flop 71. An R-C differentiator circuit comprising a capacitor 101 and a grounded resistor 103 are included in the connection between the output of inverter 99 and port R of flip-flop 71. The output of OR gate 91 is connected to a convert input port of ADC 65. The addressing, activating and de-activating signals for the circuit of FIG. 11 are transmitted on bus 67 as discussed previously with regard to FIG. 5. Operation of the circuit of FIG. 11 commences when the zone control computer puts a digital word on bus 67; in the present example, an 8-bit word whose digital code is 00111001 and whose numerical equivalent is 156, is the digital word. Shortly after this digital word is placed on bus 67, a pulse is transmitted through the ACTIVATE line of bus 67, and this pulse is transmitted to AND gate 69 to enable each quadrant. At the same time, a high signal from $\overline{Q}$ port of flip-flop 71 is transmitted to AND gate 69, the latter signal being high because the flip-flop is in its reset state as discussed below.

The output signal of AND gate 69 is transmitted to the E port of digital comparator 73 to enable the inputs of this comparator, and the B-word impressed on the input port of comparator 73 are compared with the fixed value A-words at the other input port. The latter described location 156, that is, they contain the unique address code of this location. If the B-word equals the A-word (i.e., A=B), the A=B output port of comparator 73 goes high and transmits a signal to the C input port of flip-flop 71, in turn causing port Q of flip-flop 71 to go to its high state and, in the process, disabling AND gate 69. The A=B signal is also transmitted to a delay device 105, and after a brief delay the signal is transmitted to the activate line of bus 67. The latter signal is transmitted to the zone control circuitry to, in effect, tell the zone control that the quadrant corresponding to the address code on the bus has been found.

The same bus code used for locating the particular quadrant location is advantageously the memory address code at the zone control for data coming in from the respective quadrant location. The reason for delay 105 is to give the originating pulse enough time to clear and for the activate pulse generator at the zone control to convert from the transmit to the receive mode. Separate lines could also be used, but fewer lines provide greater reliability and lower cost.

Counter 75 is a two-bit counter whose E-F outputs are initially in the "0" "0" state, in response to which multiplexer 59 is closed to bridge A', and the output 1 of decoder 81 is in its high state. As soon as the Q port of flip-flop 71 goes high, the AND gate 83 of output 1 of decoder 81 is enabled, and the resulting "high" signal passes through OR gate 91 to produce a convert pulse. The convert pulse is received by ADC 65, and the latter generates a digital equivalent signal of the output of bridge A'. As soon as ADC 65 finishes its function, it generates a signal from its EOC (and of convert) port to both bus 67 and to counter 75. The signal to bus 67 is transmitted to the zone control to instruct the zone control to store the data and prepare for the reading of the next bridge. A counter 107 in the "next quadrant" line of bus 67 does the bookkeeping for the circuit. The signal from the EOC port of ADC 65 to counter 75 transfers the E-F ports to the "0" "1" state, effecting the transmission of a signal to the E-F ports of MUX 59, this causes the latter to read bridge B' and causes decoder 81 to activate or put in its "high" state output port 2. Since the "high" signal at port 2 cannot be transmitted to OR gate 91 until its AND gate 85 is enabled by inverter 93 from the output port of AND gate 83, the "high" signal of port 2 cannot be transmitted to OR gate 91. This provision assures a low-high transition so that the convert input of ADC 65 will activate to process the next bridge.

The foregoing sequence continues until decoder output 4 goes "high" and the last convert and EOC return the E-F ports of counter 75 to the "0" "0" state again.

The output of inverter 99 associated with the output port 4 of decoder 81 goes from "high" to "low" to "high" to reset flip-flop 71 in preparation for the next interrogation interval. Counter 107 on the "next quadrant" line of bus 67 transmits a signal to "tell" the zone control to update the digital word to number 157 for interrogation of the next quadrant location. It is noteworthy that the only time a digital compare is activated is when the pulse is on the "activate" line of bus 67; thus, even if the data has the same code as a comparator, the compare function is not activated because the activate pulse is not present at that time.

Figure 12:
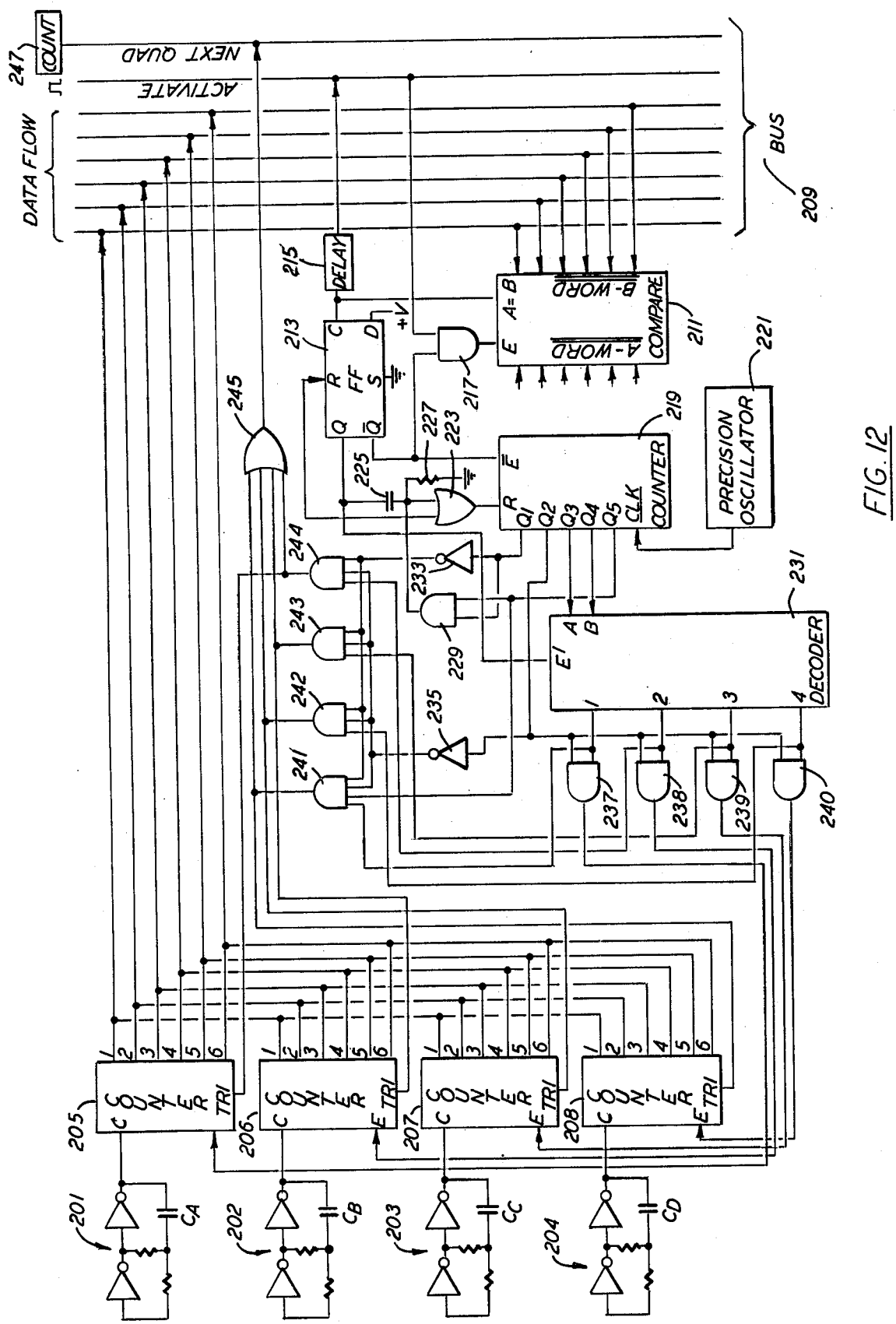
FIG. 12 is a schematic diagram of an alternative circuit to that of FIG. 11 incorporating frequency responsive stress monitoring sensors.

The circuitry of FIG. 12 is similar in function to that of FIG. 11 in that a quadrant detector circuit for one location is shown; however frequency sensitive stress monitors are incorporated rather than resistance sensitive stress monitors. A set of four sensor oscillators 201, 202, 203 and 204, each having the composition of elements discussed with regard to FIG. 10, are connected respectively to input ports "C" of frequency counters 205, 206, 207 and 208. The capacitors of the respective oscillators are designated as $C_A$, $C_B$, $C_C$ and $C_D$. Each counter has 6 output ports numbered 1-6, which are connected to 6 "DATA FLOW" lines of a bus 209.

A digital comparator 211 has B-WORD input ports connected to the 6 "DATA FLOW" lines of bus 207, and 6 fixed input ports designated A-WORDS also form part of comparator 211. Comparator 211 has an A=B port as described with regard to digital comparator 73, connected to a "C" input port of a flip-flop 213. This A=B port is also connected to the input of a delay 215, which is in turn connected to an ACTIVATE line of bus 209. An AND gate 217 has two input ports connected respectively to the ACTIVATE line of bus 209 and to an output port $\overline{Q}$ of flip-flop 213. The output port of gate 217 is connected to an enable port "E" of comparator 211. The line from the $\overline{Q}$ port of flip-flop 213 is also connected to an E port of a counter 219. A precision oscillator 221 is connected to the CLK port of counter 219.

An OR gate 223 having first input port connected to an output port Q of flip-flop 213 through an R-C circuit or differentiater composed of a capacitor 225 and a grounded resistor 227 and a second input port connected to the output port of an AND gate 229, and an output port connected to a reset or "R" port of counter 219.

A decoder 231 is provided which has an enable port E' connected to the Q port of flip-flop 213. Counter 219 has output ports $Q_1$–$Q_5$ connected respectively as follows: $Q_1$ is connected to an inverter 233; $Q_2$ is connected to an inverter 235; $Q_3$ and $Q_4$ are connected respectively to input ports A and B of decoder 231, and $Q_5$ is connected to the second input port of AND gate 229.

Decoder 231 has four output ports designated 1, 2, 3 and 4, which are connected respectively to one of a pair of input ports of each of AND gates 237–240. The other input port of each of the foregoing AND gates is connected to the $Q_2$ output of counter 219. The outputs of AND gates 237–240 are connected to the enable ports "E" of frequency counters 205–208, respectively.

A set of AND gates 241–244 is also provided. AND gate 241 has four input ports and each of AND gates 242–244 has 3 input ports. Each of these AND gates has one port connected to inverter 233, and another which is connected to inverter 235. Another input port of gates 241–244 is connected respectively to the output ports 1, 4, 3 and 2 of decoder 231. The fourth input port of AND gate 241 is connected to output port $Q_5$ of counter 219. The output ports of AND gates 241–244 are connected both to the input ports of an OR gate 245, and to the tri-state ports TRI of counters 205–208. The output of OR gate 245 is connected to the NEXT QUADRANT line of bus 209, the latter line being connected to a counter 247.

Selection of the particular quadrant to be monitored is done in the manner described with regard to the system of FIG. 7. The zone control computer sends a pulse along the ACTIVATE line of bus 209, which enables AND gate 217, causing the $\bar{Q}$ port of flip flop 213, which is in its initial "high" state to transmit a pulse to the other input port of AND gate 217 and effect the enablement of comparative 211. Comparator 211 makes a digital comparison between the word on bus 209 which has been fed to comparator 211 as the B-WORD, with the fixed quadrant code which has been impressed on comparator 211 as the A-WORD. If the A-WORD and B-WORDS are equal, the A=B port goes "high" and signal is generated switching the Q port of flip-flop 213 to its "high" state and the $\bar{Q}$ port to its low state, thereby disabling comparator 211 again. When Q of flip-flop 213 goes high, it resets counter 219 through differentiator 225, 227 and OR gate 223, so that the sensor interrogation is certain to begin at the correct place. The transition of $\bar{Q}$ to its "low" state at the same time enables counter 219, and precision oscillator 221 causes counter 219 to proceed through its normal digital progression (The precision oscillator is used when the time interval for counting the pulses from each of sensor oscillators 201–204 must be very accurate and repeatable to assure the production of credible Data).

The outputs $Q_3$ and $Q_4$ of counter 219 sequence decoder 231 through four possible output states. Thus, when A, B are equal to "0", "0", output 1 goes "high"; but AND gate 237 is only enabled when both output 1 goes "high" and output $Q_2$ of counter 219 is "high" which occurs in the second half of each of the "high" output intervals of decoder 231. This timing sequence is explained with reference to FIG. 13.

Figure 13:
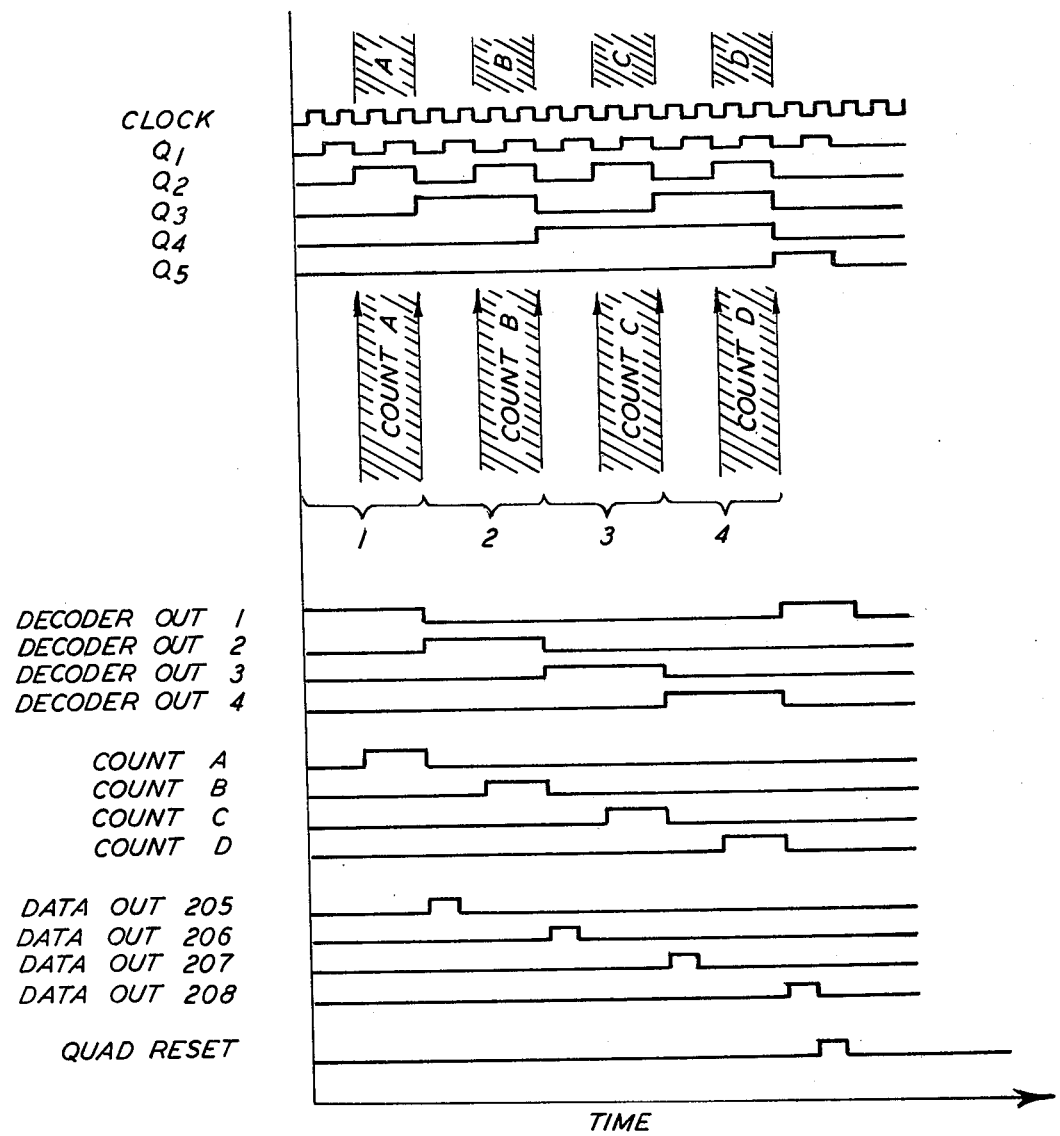
FIG. 13 is a timing diagram for the circuit shown in FIG. 12.

In FIG. 13, the relative occurrences of pulses are shown during a series of data "counts" designated as "COUNT A", "COUNT B", etc., derived from oscillator 221 to the CLK port of counter 219. Shown here are output ports $Q_1$–$Q_5$ of counter 221, outputs 1–4 of decoder 231, the inputs to the enable ports E of counters 205–208, and the output intervals for taking data from counters 205–208. Upon the termination of COUNT A, the digital data from the quadrant must be transmitted to the zone control computer. To effect this, the TRI input of counter 205 is enabled by a signal from AND gate 244, which occurs in response to the assumption of their "LOW" state by the $Q_1$ and $Q_2$ ports of counter 219. The latter occurrence takes place upon the completion of the existing count interval. Inverters 233 and 235 present AND gate 244 with the highs needed to enable the TRI output of counter 205; the third input of gate 244 receives its "high" input from output 2 of decoder 231. Thus, the switching of inputs, A, B of decoder 231 from the "0", "0" state to the "0", "1" state is effected by $Q_3$ and $Q_4$ of counter 219, as indicated in FIG. 13.

The generation of pulses to the TRI ports of counters 205–208 is indicated by the "DATA OUT" curves on FIG. 13. These same pulses are transmitted to the NEXT QUAD line of bus 209. As in the case of FIG. 11, in the circuit of FIG. 12 counter 247 located at the zone control does the bookkeeping in that it stores data from the quadrant locations and determines when the respective interrogations are complete. Upon the completion of the interrogation of each station, the address code is updated to address the next quadrant to be monitored.

The data from each stress oscillator 201–204 is transferred in turn as described above. Upon the transfer of data from oscillator 204, $Q_3$ and $Q_4$ of counter 219 return to their "0" states simultaneously and decoder output 1 returns to its "high" state. When the latter event occurs and when $Q_5$ assumes its "high" state (which occurs immediately after the transmission of a pulse to the TRI port of counter 208, which corresponds to the "DATA OUT" 208 trace in FIG. 13) $Q_5$ and $Q_1$ together activate AND gate 229 which resets flip-flop 213 and counter 219. Also at this time, $\bar{Q}$ of flip-flop 213 returns to its "high" state and the resultant signal disables counter 219 and enables AND gate 217 to prepare the latter for the next cycle. Also, Q of flip-flop 213 goes "low" to disable decoder 231 so that all of its outputs are in their "low" states and inactive, and the cycle is then complete.

It should be noted that the resistance bridges A'–D' of FIG. 11 could be used in a system using the pulse counting feature of the embodiment of FIG. 12, by providing for the transmission of the analog output of the respective resistance bridges to a voltage-to-frequency converter, which could correspond functionally to the analog to digital converter (ADC) 65 in FIG. 11.

The preceding embodiments have incorporated interrogation and data transfer procedures in the "digital domain". Digital techniques offer many advantages in terms of resolution and data stability, factors which can be of great importance in a hostile temperature environment in which at least part of the pipeline being monitored might well be located. However, analog transmission does offer some significant advantages. Analog transmission makes possible the use of fewer transmission lines than digital transmission. An analog transmission system could be established requiring only one analog to digital converter (ADC) per zone, and it could be located at the zone control. Furthermore, if amplitude modulated radio frequency signals were generated by the system for processing, the analog data could be transmitted directly. However, it is expected that the adoption of the foregoing would be at the expense of the availability of highly efficient microprocessor computations and data reduction at the zone control.

Figure 14:
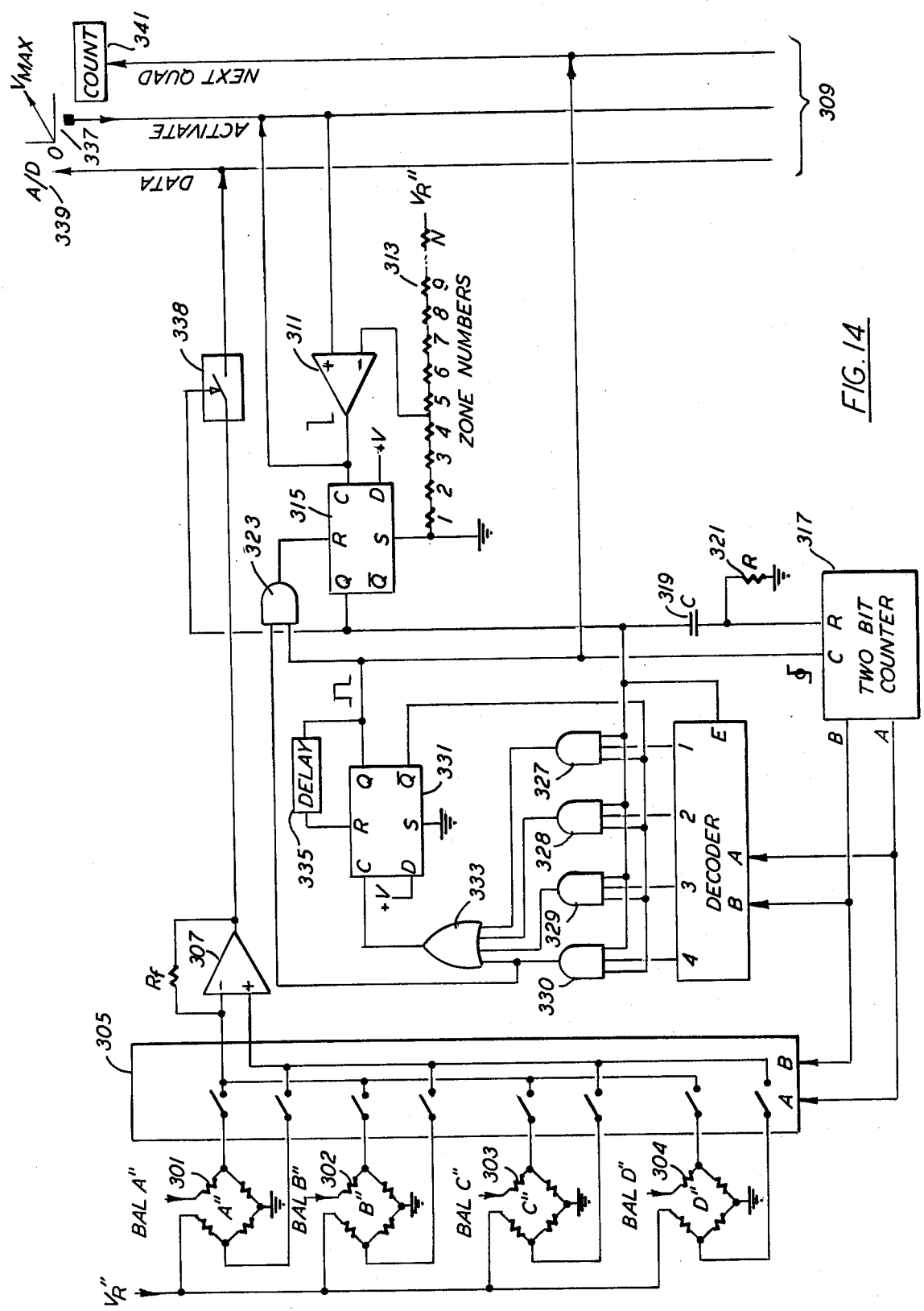
FIG. 14 is a schematic diagram of a circuit for processing signals from sets of electrically connected sensors in a given zone, using analog data collection and transmission techniques according to the system of FIG. 1.

FIG. 14 shows a circuit incorporating analog techniques for collecting and transmitting data in analog form from a particular quadrant location. The circuit includes four resistance stress monitors 301, 302, 303 and 304 (also labeled A″, B″, C″ and D″) in the form of open bridge circuits, each having one open leg to a balance voltage source ($V_{A''}$, $V_{B''}$, $V_{C''}$ and $V_{D''}$) and another open leg connected to a voltage source $V_{R''}$ for automatic balancing purposes as discussed earlier with respect to FIG. 11. Monitors 301–304 are connected to a multiplexer (or MUX) 305, whose outputs are connected to the positive and negative input ports of an amplifier 307, across which is connected a feedback resistor $R_f$.

A bus 309 for connecting the quadrant detectors of the particular zone is provided, which includes a DATA line, an ACTIVATE line and a NEXT QUAD line. A linear ramp is applied to the ACTIVATE line as indicated by the curve $V_{MAX}$. A precision high input impedance comparator 311 is connected at its positive input port to the ACTIVATE line of bus 309, and at its negative input port to a resistance divider 313 having a number of resistors "N" corresponding to the number of quadrant locations in the zone. A particularly advantageous form of the divider network would be fabricated using thick film technology with each quadrant having identical resistive elements and with each comparator (corresponding to device 311) for successive zones along the pipeline getting its reference voltage from the next higher resistor pick-off point. A continuous ladder need not be used, the requirement only being that an incrementally higher comparator reference is available for each zone.

A flip-flop 315 has an input port C connected to the output of comparator 311. Another input port D is connected to a voltage source V. Resistor network 313 is connected to a reference voltage $V_R$ on one side and ground on the other side. Another output port Q is connected to (and closes) analog switch 338 and to a reset port R of a two-bit counter 317 across a differentiator comprising a capacitor 319 and a grounded resistor 321. Finally, an input port R of flip-flop 315 is connected to the output of an AND gate 323. Counter 317 has output ports A and B which are connected to corresponding input ports of MUX 305 and a decoder 325.

Decoder 325 has outputs 1, 2, 3 and 4 connected respectively to AND gates 327, 328, 329 and 330. Other inputs of AND gates 327–330 are connected to the Q output of flip-flop 315 and to the $\bar{Q}$ output of a second flip-flop 331. The outputs of AND gates 327–330 are connected to an OR gate 333, and the output of AND gate 330 is also connected to the input of AND gate 323.

The output of OR gate 333 is connected to an input port C of flip-flop 331. Input port D of device 331 is connected to a voltage source V, input port S is grounded, and output Q is connected through a delay 335 to an input port R and an output port $\bar{Q}$ is connected to an input of AND gate 327–330 as noted previously.

The functions and operations of the bridge network, decoder and associated AND gates, OR gate 333, counter 317 and flip-flop 315 are similar to the corresponding components of the circuit shown in FIG. 11.

Upon the transmission of a ramp voltage on ACTIVATE line of bus 309, comparator 311 goes high when the voltage of a ladder input is exceeded, thereby causing the Q output of flip-flop 315 to go high which in turn sets counter 317 to "0", "0"; decoder 325 is subsequently enabled and its "1" output goes "high" causing one of the outputs of each AND gate 327–330 to go high. At the same time, a pulse is transmitted from the output of comparator 311 to the ACTIVATE line of bus 309 to "freeze" the ramp generator 337 at its then current value.

The transmission of pulses to the A, B inputs of MUX 305 causes the cycling of the MUX in much the same manner as described with regard to MUX 59 in FIG. 11, except that in this case the analog output of MUX 305 is transmitted directly through amplifier 307 to the DATA LINE of bus 309. Thus, the analog to digital converter used in the circuitry of FIG. 11 is dispensed with in the circuitry of FIG. 13. The signal transmitted to the DATA LINE through closed switch 338 is then transmitted to an analog to digital (A/D) converter 339 at zone control before being put into the memory of the computer.

The $\bar{Q}$ of flip-flop 331 is initially high and completes the enablement of AND gate 327 associated with output 1 of decoder 325. Upon the generation of an output from AND gate 327, OR gate 333 goes "high" and the Q output of flip-flop 331 goes "high" to clock counter 317 to the "0", "1" state. The pulse from output Q is also transmitted to a delay 335 and then to a reset port R of flip-flop 331 to cause this device to reset itself. The output of the $\bar{Q}$ port of flip-flop 331 goes "high", causing AND gate 328 associated with output 2 of decoder 325 to go "high", whereupon OR gate 333 again sends a signal to the C input of flip-flop 331 to clock the latter and the interrogation of all four sensor locations 301–304 occurs. When decoder output 4 goes "high" and the readout of bridge 304 (D") readout has been accomplished, AND gate 323 is enabled to transmit a signal to reset port R of flip-flop 315 to reset the latter and complete the cycle. Switch 338 opens thereby disconnecting this quadrant from the bus.

A counter 341 in the NEXT QUAD of bus 309 does the bookkeeping for the system. As soon as the interrogation of a quadrant is finished, ramp 337 commences to climb again but stops as soon as the next comparator (corresponding to comparator 311) is triggered as discussed above.

Satisfactory resolution is obtainable with a system of the type shown in FIG. 14. If a 15-volt ramp were used and if the resistive network were divided into 50 mV segments, a single ramp could handle 300 quadrants (that is, 15 volts divided by 0.05 volts per quadrant=300 quadrants) with a laser trimmed divider network and with inexpensive comparators that have 15 mV accuracies; it is apparent that this low-cost method of quadrant data transfer would be very effective.

If zone data is to be collected by a passing aircraft, it is noteworthy that a signal command from the plane can instruct the zone control to turn on the power to the quadrant in that zone. Thus, power efficiency would be very good since the only eternally-active components would be the zone control centers.

The time for interrogating the quadrants in a zone could be quite acceptable. If the passing aircraft referred to above is flying at 300 miles per hour and if a zone control center is located every 4 miles along the pipeline, about 47 seconds would be available to interrogate the quadrants in each zone. Thus, if there are 300 quadrants per zone the interrogation time available is 156 milliseconds per quadrant, or 39 milliseconds per sensor location. Allowing margin, if the analog to digital converter (A/D 339) is as slow as 10 milliseconds per conversion (which is a very slow A/D converter), or 10 milliseconds per count interval, there would be sufficient time available for interrogation, zone updating and the zone control computations. These calculations are apparent from previous discussions herein.

Numerous methods are available for transmitting to and from the aircraft (if this method is used). The transmission from the aircraft would be coded in much the same manner as the coding for the individual zones, so that only the zone of interest is activated for reception and transmission of data. Upon completion of the transmission of data from a zone, the next code would be transmitted by the aircraft to activate that zone, etc., in sequence. The embodiments discussed above have been directed to the computation of both stress and stress gradients through the use of quadrant detection geometry and zone distribution. The information thus obtained could be used to compute the "time gradient" or the rate at which the detected stresses are building up and also the rate at which the deformations are moving. If the zone interrogation is clocked to occur on an hourly interval, the hourly variations can be computed at the zone control computer, or the data taken from the local memory could be computed at the central control computer.

The data obtainable by the invention disclosed herein is of extreme importance. A high rate of movement of stresses or deformation would be indicative of the existence of very unstable soil conditions, caused for example by temperature related changes which occur during the change of seasons or resulting from earth tremors or the like. The early detection of dangerously high rates would permit the orderly termination of the fluid pressure in the pipeline being monitored which would in turn avoid what could be a catastrophic failure. The reading of the monitoring information could be done by a human operator who would in turn have the fluid pressure reduced, although means could be provided for transmitting a "danger" signal directly to a pressure reduction or shutoff valve that are periodically located along the pipe. Thus, sensor saturation or excessive signal levels, which indicate the possibility of catastrophic failure, could be used to control cut-off valves periodically located along the pipe. Further implementation could serve to simply reduce pressure (and flow rate) to bring total stress back within acceptable limits.

The invention has been described in detail with particular reference to preferred embodiments thereof, but it should be understood that variations and modifications may occur to those skilled in the art to which the invention pertains.

I claim:

1. A system for monitoring a pipeline for stress-related characteristics, said system comprising:
   a plurality of sets of sensing means connectable to a pipeline at different locations along the pipeline for sensing applied stresses and for acquiring electrical characteristics reflective of the values of the applied stresses;
   first measuring means electrically connectable to the respective sensing means to generate electrical signals reflective of the values of the applied stresses
   second measuring means electrically connectable to the respective sets of sensing means, to generate electrical output signals reflective of the relative values of the applied stresses in sensing means in at least two of said sets of sensing means to indicate the stress gradient between the locations of at least two sets of sensing means; and
   computation means for evaluating the signals generated by said first and second measuring means.

2. A system according to claim 1 and further comprising:
   bus means connecting said sets of first measuring means and said computation means; and
   means for sequentially operating said first measuring means to operably connect said first measuring means to said computing means.

3. A system according to claim 1 wherein said sets of sensing means comprise quadrants of four sensing means connected around the pipeline at the respective locations.

4. The invention according to claim 3 wherein said sets of sensing means comprise four sensors mounted equiangularly about sections of the pipeline at each location.

5. The invention according to claim 4 wherein the first measuring means connected to the sensors mounted on opposite sides of the pipeline at each location generate signals reflective of the differential value of the stresses applied to the opposing sensors.

6. The invention according to claim 5 wherein second measuring means is electrically connected to those of said first measuring means connected to corresponding sensors in adjacent sets of sensors on the pipeline, said second measuring means receiving the signals of said last mentioned first measuring means and generating output signals reflective of the differential between the output signals of said last mentioned first measuring means.

7. The system according to claim 1 and further comprising:
   accumulating means connected to said sets of sensing means for receiving electrical signals from the respective sets of sensing means, for reducing the received signals according to predetermined criteria and for generating ouput signals reflective of the values of said reduced signals.

8. The system according to claim 7 wherein said accumulating means comprises:
   data processing means electrically connected to said first and second measuring means for receiving signals generated by said first and second measuring means and for comparing said received signals to said predetermined criteria and for transmitting as output signals only those signals which exceed said criteria.

9. The system according to claims 7 or 8 and further comprising:
   central control means connected to said accumulating means for receiving the output signals of said accumulating means, and for displaying the reduced signals in an intelligible form.

10. The system according to claim 1 wherein said sets of sensing means are electrically connected into at least two groups of sets of sensing means, said groups being disposed at adjacent zones of said pipeline.

11. The system according to claim 10 and further comprising:
    accumulating means connected to each of said groups of sets of sensing means for receiving electrical signals from the respective sets of sensing means, and for reducing the received signals according to predetermined criteria and for generating output signals reflective of the value of said reduced signals.

12. The system according to claim 11 wherein said accumulating means comprises data processing means connected to the first and second measuring means in the respective groups of sets of sensing means, for reducing the signals received from said measuring means according to predetermined criteria, and for generating output signals according to the reduced signal values.

13. The system according to claim 12 and further comprising control means connected to each of said accumulating means for receiving the output signals of said accumulating means and for displaying the reduced signals in an intelligible manner.

14. The invention according to claim 13 and further comprising transmitter/receiver means connected to each of said accumulating means and to said central control means, for receiving the output signals of said accumulating means for transmitting information signals to said central control means.

15. The invention according to claims 8 or 12, wherein said accumulating means further comprises memory means for receiving and storing electrical signals generated by said data processing means.

16. The invention according to claims 7 or 11 and further comprising bus means electrically interconnecting said sets of measuring means and said accumulating means.

17. The invention according to claim 1 wherein each set of sensing means and said measuring means further comprise:
   addressing means for activating said set in response to the reception of a predetermined address code signal, to effect the transmission of output signals of said measuring means to said computation means;
   address code generating means electrically connected to each of said addressing means for sequentially generating the predetermined address code signals of said sets to the respective sets.

18. The invention according to claim 17 wherein said addressing means comprises decoding means for activating said set in response to the reception of a predetermined digital code signal; and said address code generating means comprises means for generating to the sets the respective predetermined digital codes of said sets to effect the sequential activation of said sets.

19. The invention according to claim 1 wherein said sets of sensing means and connected measuring means further comprise multiplexing means connected to said first measuring means and actuable for sequentially interrogating said first measuring means and for transmitting in sequence the output signals of said first measuring means.

20. The invention according to claim 19 and further comprising:
   decoding means connected to said multiplexing means in the respective sets for actuating said multiplexing means in response to the reception of a predetermined address code signal;
   address code generating means for generating to the decoding means of the respective sets, sequential address code signals having the respective predetermined address code values; the said decoding means actuating in sequence the multiplexing means in the respective sets.

21. The invention according to claim 20 and further comprising coding means connected to said multiplexing means for encoding the output of said multiplexing means and for transmitting the encoded signals to said computing means.

22. The invention according to claim 21 and further comprising accumulating means electrically connected to said encoding means for receiving and storing the encoded signals from said multiplexing means.

23. The invention according to claim 1 wherein said first measuring means are operable to generate electrical output signals whose amplitudes are reflective of the relative values of said applied stresses.

24. The invention according to claims 1, 2, 3, 4 19 or 23 wherein said first measuring comprise bridge circuits and said sensing means comprise pressure-sensitive variable resistance means connected in said bridge circuits, said bridge circuits including means for electrically balancing the respective circuits, and said circuits becoming imbalanced to generate output signals in response to the application of stress by the pipeline to said sensing means.

25. The invention according to claim 1 wherein said first measuring means are operable to generate electrical output signals whose amplitudes are reflective of the relative values of said applied stresses.

26. The invention according to claim 1 wherein said first measuring means are operable for generating electrical output signals whose frequencies are reflective of the values of said applied stresses.

27. The invention according to claim 26 wherein said first measuring means comprise stress oscillators.

28. The invention according to claim 27 wherein said first measuring means further comprise interval counting means connected to said stress oscillators for counting the frequency of oscillation for predetermined time periods, and for generating digital output signals according to the frequencies counted.

29. The invention according to claim 28 and further comprising digital multiplexing means for interrogating said interval counting means and for transmitting digital output signals to said computing means.

30. The invention according to claim 1 and further comprising:
   coding means associated with each of said sets for activating said sets to generate output signals in response to a unique coded address signal; and
   address code means for generating the unique coded address signals to said coding means to activate adjacent sets in sequence.

31. The invention according to claim 30 wherein said coded address signals are in binary code.

32. The invention according to claim 1 wherein said sets of sensing means comprise transducers attached to the pipeline at the respective locations, each set having said transducers attached at like relative locations, and further comprising resilient members extending from transducers in adjacent sets at corresponding locations and fixed relative to the pipeline at places intermediate said corresponding locations, said resilient members being taut when the pipeline is in a static, unloaded state and the pressure in said resilient members varying in response to the bending of the pipeline at the locations of said transducers.

33. The invention according to claim 1 wherein said sensing means comprise variable impedance elements whose impedance value varies in accordance with pressure applied to said elements, and generally rigid means attached to the pipeline at said locations for applying pressure to said elements in response to the bending of the pipeline and said locations.

34. The invention according to claims 1 wherein said sensing means comprise capacitance means having capacitance plates, and means for varying said spacing in response to the bending of the pipeline at said capacitance means.

35. The invention according to claim 1 wherein said sensing means comprise electrically connected oscillator means, said oscillator means being adjustable in response to the application of stress from the pipeline to effect a frequency response reflective of the applied stress.

36. A system for monitoring a pipeline for stress-related characteristics, said system comprising:
   a set of sensing means connectable to a pipeline at a specific location around the pipeline for sensing applied stresses at the location and for acquiring electrical characteristics reflective of the values of the applied stresses;
   first measuring means electrically connectable to one pair of said sensing means to generate electrical signals reflective of the values of the applied stresses on said one pair of sensing means;

second measuring means electrically connectable to a second pair of said sensing means, to generate electrical output signals reflective of the relative values of the applied stresses on said second pair of sensing means;

computation means for evaluating the signals generated by said first and second measuring means for indicating the direction of deflection of the pipe line at said specific location.

* * * * *